(12) United States Patent
Hurst et al.

(10) Patent No.: US 7,367,059 B2
(45) Date of Patent: Apr. 29, 2008

(54) SECURE CONTENT ACTIVATION DURING MANUFACTURE OF MOBILE COMMUNICATION DEVICES

(75) Inventors: Leon Hurst, Helsinki (FI); Samuli Tuoriniemi, Oulu (FI)

(73) Assignee: Nokia Corporation, Espoo (FI)

( * ) Notice: Subject to any disclaimer, the term of this patent is extended or adjusted under 35 U.S.C. 154(b) by 994 days.

(21) Appl. No.: 10/161,069

(22) Filed: May 30, 2002

(65) Prior Publication Data
US 2003/0226030 A1 Dec. 4, 2003

(51) Int. Cl.
*H04L 9/00* (2006.01)
(52) U.S. Cl. .................. 726/26; 713/173; 713/189; 713/193
(58) Field of Classification Search ........... 713/193, 713/165, 158, 173, 189; 455/558, 572; 380/247, 201, 203; 726/26
See application file for complete search history.

(56) References Cited

U.S. PATENT DOCUMENTS

| | | | | |
|---|---|---|---|---|
| 5,748,084 A * | 5/1998 | Isikoff | ................ | 340/568.1 |
| 5,910,987 A | 6/1999 | Ginter et al. | | |
| 6,085,976 A | 7/2000 | Sehr | | |
| 6,112,085 A | 8/2000 | Garner et al. | | |
| 6,216,014 B1 * | 4/2001 | Proust et al. | ................ | 455/558 |
| 6,317,783 B1 | 11/2001 | Freishtat et al. | | |
| 6,336,585 B1 * | 1/2002 | Harada | ................ | 235/380 |
| 6,367,019 B1 * | 4/2002 | Ansell et al. | ................ | 726/26 |
| 6,381,477 B1 * | 4/2002 | Johnson et al. | ................ | 455/572 |
| 6,385,596 B1 * | 5/2002 | Wiser et al. | ................ | 705/51 |
| 6,460,138 B1 * | 10/2002 | Morris | ................ | 713/184 |
| 6,631,416 B2 | 10/2003 | Bendinelli et al. | | |
| 6,986,030 B2 * | 1/2006 | Shmueli et al. | ................ | 713/1 |
| 7,010,809 B2 | 3/2006 | Hori et al. | | |
| 7,012,503 B2 | 3/2006 | Nielsen | | |
| 7,083,095 B2 * | 8/2006 | Hendrick | ................ | 235/451 |
| 7,114,048 B2 * | 9/2006 | Iwatsu et al. | ................ | 711/165 |
| 7,124,304 B2 * | 10/2006 | Bel et al. | ................ | 713/193 |
| 7,219,227 B2 | 5/2007 | Hori et al. | | |
| 2002/0007456 A1 * | 1/2002 | Peinado et al. | ................ | 713/164 |
| 2002/0073070 A1 * | 6/2002 | Morita et al. | ................ | 707/1 |
| 2002/0136405 A1 | 9/2002 | Hori | | |
| 2002/0138442 A1 | 9/2002 | Hori et al. | | |

(Continued)

OTHER PUBLICATIONS

"Digital Rights Management and Superdistribution of Mobile Content", copyrighted 2001.

(Continued)

*Primary Examiner*—Nasser Moazzami
*Assistant Examiner*—Shanto M Z Abedin
(74) *Attorney, Agent, or Firm*—Hollingsworth & Funk, LLC

(57) ABSTRACT

A method and apparatus for activating protected content on a portable memory device when the portable memory device is incorporated into a mobile terminal during the manufacture of the mobile terminal. During manufacturing, the portable memory device is coupled to the mobile terminal, and the mobile terminal is powered on. An activation program resident on the mobile terminal is executed upon power on of the mobile terminal. The activation program imports a secure rights database of rights files from the portable memory device, activates an active rights database resident on the mobile terminal based on the imported secure rights database, and disables the secure rights database on the portable memory device to prevent subsequent unauthorized use of the portable memory device.

23 Claims, 10 Drawing Sheets

U.S. PATENT DOCUMENTS

2002/0186842 A1* 12/2002 Sabet-Sharghi et al. .... 380/200
2003/0026432 A1*  2/2003 Woodward .................. 380/278
2004/0043788 A1   3/2004 Mittal
2005/0021948 A1*  1/2005 Kamperman ................ 713/165

OTHER PUBLICATIONS

U.S. Appl. No. 10/161,080, filed May 30, 2002, Hurst et al.

* cited by examiner

SECURE CONTENT ACTIVATION DURING MANUFACTURE OF MOBILE COMMUNICATION DEVICES

FIELD OF THE INVENTION

This invention relates in general to mobile communications, and more particularly to a method and apparatus for activating protected content on a memory device when the memory device is incorporated into a mobile terminal during the manufacture of the mobile terminal.

BACKGROUND OF THE INVENTION

New technologies are continually emerging, enabling new types of content to be delivered over mobile networks for use with mobile terminals. The success of Short Message Service (SMS) fueled further developments such as Enhanced Messaging Service (EMS), Multimedia Messaging Service (MMS), and other communications protocols which allow the transmission of more than merely textual content. These and other new technologies allow for a variety of different types of content to be communicated to and from mobile (and landline) devices, including ringing tones, icons, Java games, video clips, software tools, etc.

However, with the increasing use of multimedia content on mobile devices, it can be difficult to store and/or transfer these voluminous pieces of content on mobile terminals such as mobile telephones. Because multimedia content can be quite sizeable in terms of digital volume, providing content on removable memory cards rather than over-the-air (OTA) has become a popular way of distributing digital content to mobile users.

For this type of digital content delivery to be beneficial for all parties concerned, solid methods for managing the access and use of the content needs to be in place. To ensure business profitability, content retailers/providers' copyrights need to be protected to provide an incentive for such providers to continue developing and publishing digital content. Content retailers include, for example, operator portals, various media companies, and entrepreneurs. One manner of providing such protection is to secure the content on removable memory cards, so that only authorized users can access, use, or distribute the content.

Existing solutions for securing content includes large-scale, complex third-party software/hardware solutions (e.g., for high-quality music), or the use of secure removable media technology such as Secure MMC™. With respect to the complex third-party solutions, such solutions are targeted at very valuable content, which is often an unnecessary and overly expensive solution for mobile content. Further, such solutions are proprietary and are not interoperable, and are of a significant size that is simply not useful in the context of small, mobile communication devices. With respect to secure removable media technology, these solutions only address the problem of security on the memory card, and do not address security at the implementation level. Further, distributors of content are forced to use expensive special-purpose cards if security is desired, which adversely affects profitability.

Accordingly, there is a need in the communications industry for a manner of providing cost-effective portable memory devices that have security commensurate with what is required for mobile content. The present invention fulfills these and other needs, and offers other advantages over the prior art.

SUMMARY OF THE INVENTION

The present invention is directed to activation of protected content on a memory device when the memory device is incorporated into a mobile terminal during the manufacture of the mobile terminal.

In accordance with one embodiment of the invention, a method is provided for activating a mobile terminal for use with a portable memory device during production of the mobile terminal. The method includes coupling the portable memory device to the mobile terminal, and powering on the mobile terminal. The method further includes executing a program resident on the mobile terminal, where the program imports a secure rights database of rights files from the portable memory device, activates an active rights database resident on the mobile terminal based on the imported secure rights database, and disables the secure rights database on the portable memory device to prevent subsequent unauthorized use of the portable memory device.

In more particular embodiments of this method, activating the rights database includes decrypting the imported secure rights database and updating the active rights database to include the rights files associated with the imported secure rights database. In another particular embodiment, the program further locates an encryption key hidden within the mobile terminal-resident program, where decrypting the imported secure rights database involves decrypting the imported secure rights database using the encryption key. Another particular embodiment involves the program's receipt of a memory device identifier unique to the portable memory device, where decrypting the imported secure rights database includes decrypting the imported secure rights database using the memory device identifier. In another particular embodiment, the program derives an encryption key from a secret key hidden within the mobile terminal-resident program and a memory device identifier unique to the portable memory device, where decrypting the imported secure rights database involves decrypting the imported secure rights database using the derived encryption key. In another particular embodiment, one of a plurality of encryption keys is used in advance of the manufacturing process to encrypt the secure rights databases stored on a group of portable memory devices, where the portable memory device coupled to the mobile terminal is one of those devices in the group. During manufacturing, the program locates the particular one of a plurality of encryption keys from an encryption key bank stored with the program. Decrypting the imported secure rights database then involves decrypting the imported secure rights database using the particular encryption key from the encryption key bank.

In accordance with another embodiment of the invention, a mobile terminal under construction is provided. The mobile terminal includes a removable memory card. The removable memory card includes secure content and a secure rights database of rights files for enabling use of the secure content. The mobile terminal includes an active rights database, and a storage module for storing an activation program. The mobile terminal includes a processor configured to execute the activation program upon initiation of the activation program during production of the mobile terminal. Execution of the activation program causes importing of the secure rights database from the removable memory card, decrypting of the imported secure rights database, updating of the active rights database to include the rights files associated with the decrypted secure rights database, and disabling of the secure rights database on the removable memory card.

In accordance with another embodiment of the invention, an assembly line process is provided for manufacturing mobile terminals. The process includes installing an activation program on a mobile terminal. The activation program is capable of importing a secure rights database of rights files from a portable memory device, activating an active rights database resident on the mobile terminal based on the imported secure rights database, and disabling the secure rights database on the portable memory device. The assembly line process further includes inserting the portable memory device into the mobile terminal, and powering on the mobile terminal to execute the activation program. The mobile terminal can then be powered off upon completion of execution of the activation program.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

Figure 1:
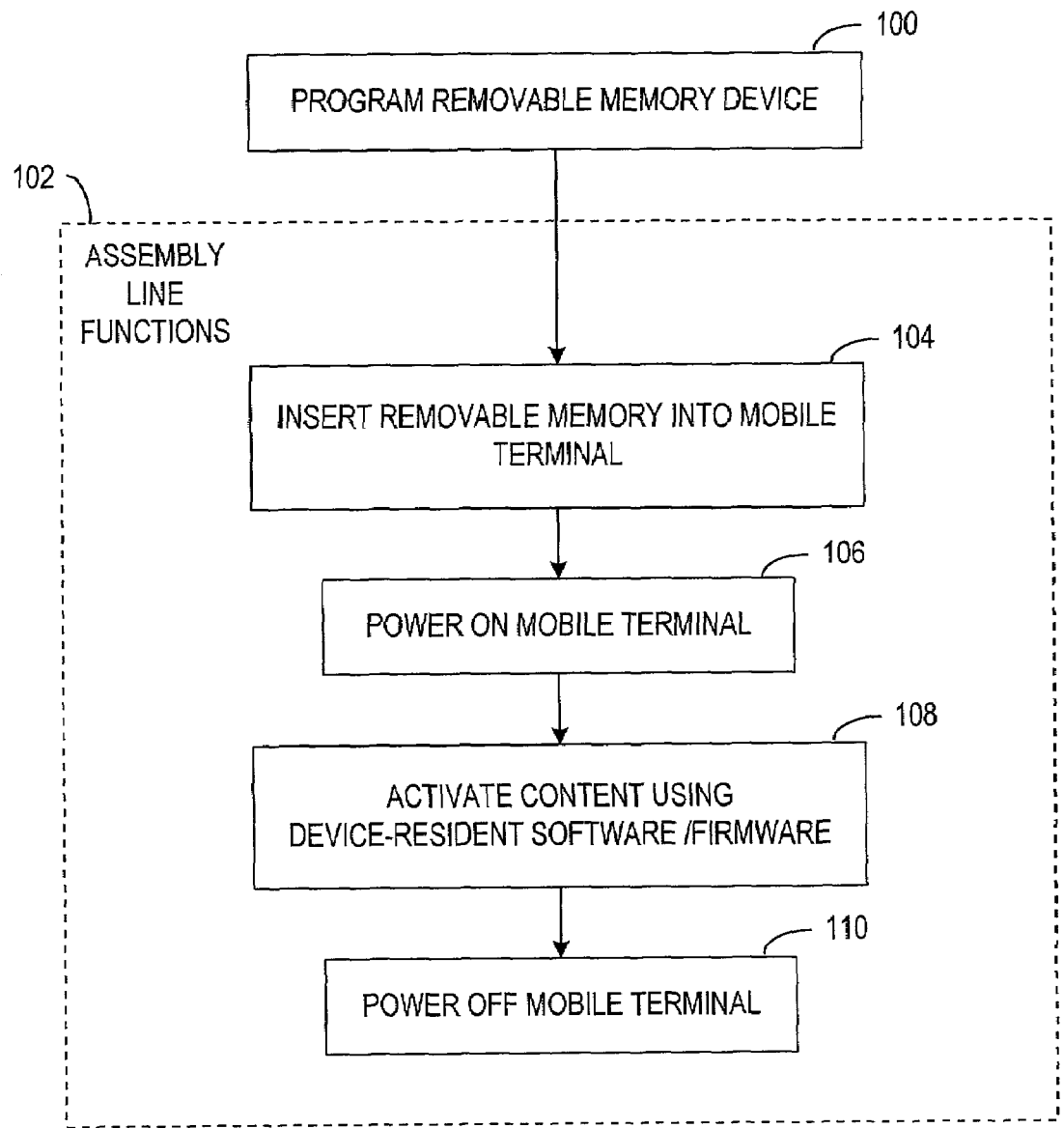
FIG. 1 is a flow diagram illustrating an exemplary method for activating protected content on a removable memory for use with a mobile terminal during the manufacturing process of the mobile terminal.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a manner of activating content that has been securely stored on a portable memory device during the manufacturing of the mobile terminal to which the portable memory device is to be used with. The portable memory device is pre-loaded with mobile content, such as ringing tones, screen savers, games, music, and the like. Because the content provided on such portable memory devices is secured (e.g., encrypted) to prevent its unauthorized use, the present invention provides a manner of activating that content during the manufacturing process.

The protected content storage and activation in accordance with the present invention is beneficial in a variety of contexts. One such context is in the content retailing industry, where unlawful transfers of content without the requisite payment can greatly impact the success of content retailers, developers, and authors. On the other hand, it is desirable to provide such content to users in various ways to accommodate the needs of different users, and to allow flexibility for content distribution. The present invention provides for the secure loading of content to removable memory devices and secure activation of that content during the manufacturing process. Once activated in this fashion, the user can obtain access to the content according to corresponding rights file "usage rights."

Content retailers include operator portals, various media companies and entrepreneurs. Payment collectors complement the content retailer's business by offering a platform for collecting payments. For example, mobile operators may serve as the payment collector, offering its billing platform for multiple content retailers. Other examples include external server-based payment systems that offer payment channels, e.g. for credit cards and debit cards, or terminal-based payment applications in which case there is no need for operator billing system in the payment process. Regardless of the payment methodology employed, the future service architecture must ensure that whenever content is consumed, the payment gets collected. This is vital to avoid losing revenue through unauthorized content transfers, such as through content "pirating."

Addressing unauthorized content delivery and/or receipt often involves delivery control methodologies, which controls the manner in which content can be delivered or transferred. An alternate control mechanism to delivery control is usage control. In accordance with the present invention, usage rights are expressed in rights files, that control the terminal user's access to the content. One manner in which a terminal user may obtain content is by purchasing the content on a secure memory device, such as a removable memory device that can be inserted into a user's mobile terminal. This may be beneficial where the content is otherwise too large for practical OTA transmission, or where a user has just started a subscription with an operator or mobile Internet Service Provider (mISP). In accordance with the invention, the removable memory devices can be provided with one or more different pieces of content that is protected by the rights files until authorized for use, in order to protect the content until a consumer has paid or otherwise been authorized to use the content. Further, rights files themselves are protected, such that they are not available until "activated," and this activation is effected at the time of manufacture/production of the terminal that will be accessing the content.

FIG. 1 is a flow diagram illustrating an exemplary method for activating protected content on a removable memory for use with a mobile terminal during the manufacturing process of the mobile terminal. A removable memory device is programmed 100. The removable memory device may be programmed in advance, and received by the mobile terminal manufacturer in a programmed state. For example, a content distributor may sell removable memory devices, pre-programmed with the protected content, to manufacturers of mobile terminals to be included with the sale of the mobile telephones. Alternatively, the removable memory device may be programmed during manufacture of the mobile terminal. As described more fully below, the removable memory device includes a database of rights files (RFs), where each rights file defines the usage rights to a piece of content on the removable memory device. This rights database (RDB) is secure, and cannot be accessed until activated in accordance with the present invention.

In accordance with the present invention, the content on a removable memory device is activated during manufacture of the mobile terminal that is equipped with the removable memory device. Thus, in one embodiment of the invention, activation is performed in connection with a series of assembly line functions 102. The removable memory device is inserted 104 into a mobile terminal. The mobile terminal may be any of a number of mobile communication devices, such as a wireless/cellular telephone, personal digital assistant (PDA), notebook or laptop computer, mobile music players, or any other type of wireless communication device. The memory device may be inserted 104 into the mobile terminal by plugging the portable memory device into a receptacle on the mobile terminal configured to receive the portable memory device. Other manners of coupling the portable memory device to the mobile terminal may also be used, such as via hard-wiring or coupling by current or future circuit board connections, depending largely on the characteristics of the memory device.

After the removable memory device has been coupled to the mobile terminal, the mobile terminal is powered on 106. The content is automatically activated using device-resident software or firmware, as illustrated at block 108. The software/firmware operates, of course, under the control of computing hardware such as a processing unit, memory, and other computing hardware within the mobile terminal. In accordance with one embodiment of the invention, the activation involves unlocking the rights database to make the rights files in the rights database available for further unlocking secured content when an ultimate terminal user is authorized to do so. Once activated, the mobile terminal can be powered off 110.

Figure 2:
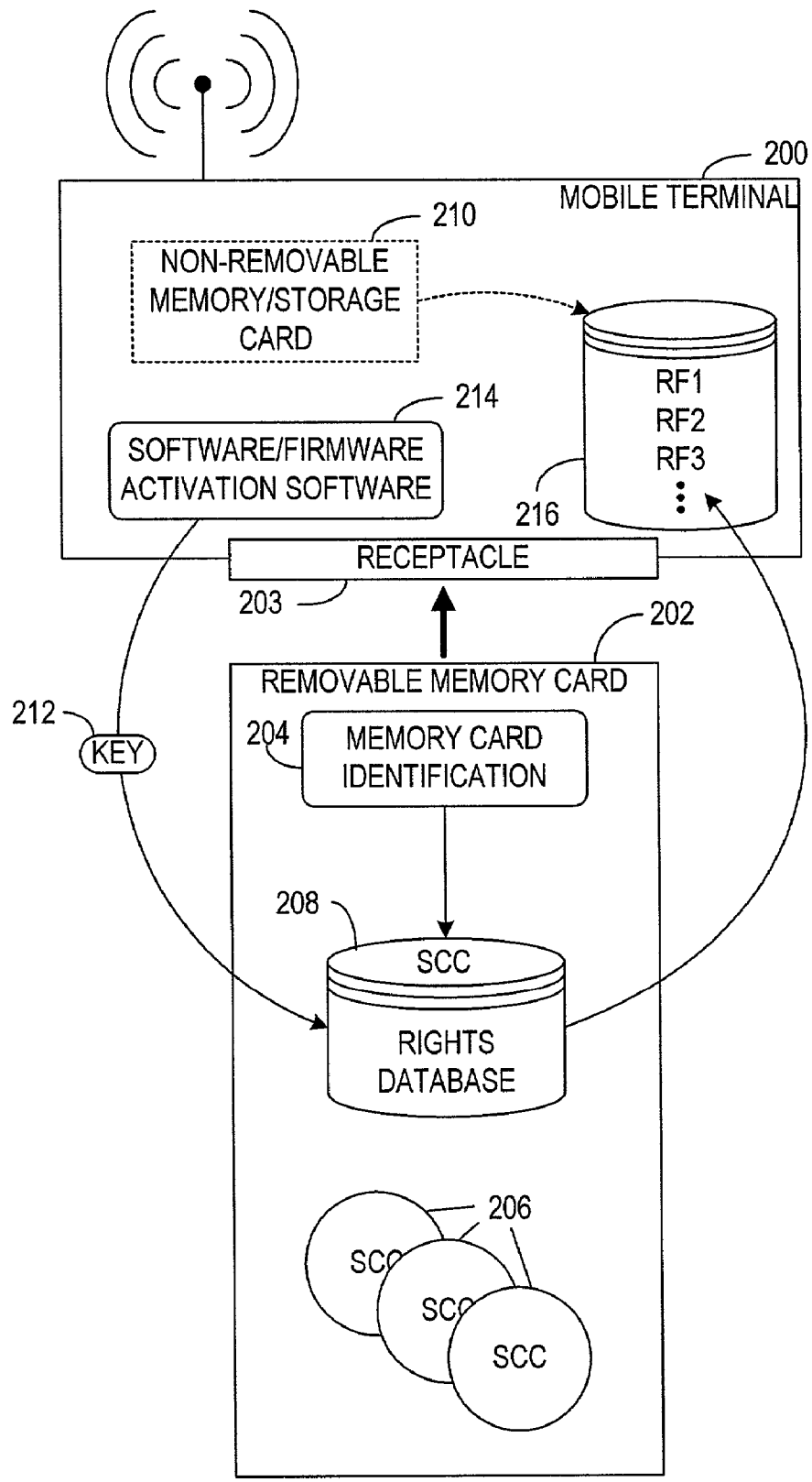
FIG. 2 is a block diagram of an exemplary mobile terminal and associated memory device which can be activated during the manufacturing process in accordance with the principles of the present invention.

FIG. 2 is a block diagram of an exemplary mobile terminal and associated memory device which can be activated during the manufacturing process in accordance with the principles of the present invention. In the embodiment of FIG. 2, a mobile terminal 200 is shown. The mobile terminal 200 may represent any of a number of mobile communication devices, such as a cellular telephone, personal digital assistant (PDA), notebook or laptop computer, mobile music players, or any other type of wireless communication device.

Associated with the mobile terminal 200 is local memory and/or storage. Such memory may be integral to the mobile device, such as Random Access Memory (RAM), Read-Only Memory (ROM), or variations thereof such as flash ROM, Erasable Programmable ROM (EPROM), etc. Another type of memory that may be used in connection with current and future mobile terminals 200 is removable memory, such as the removable memory card 202 illustrated in FIG. 2 which may be plugged into the mobile terminal 200 via the receptacle 203. The memory card 202 represents any commercially available or proprietary portable memory device, such as the MultiMediaCard (MMC) by SanDisk, Solid State Floppy Disk Card (SSFDC) by Toshiba Corp., Memory Stick® by Sony, or any other flash card, flash memory, or the like. Such removable memory cards 202 may be used by mobile users who already possess mobile terminals, or by those who have just purchased a new mobile terminal. For example, a person starting a subscription with an operator or mISP may receive the removable memory card 202 with his/her Subscriber Identity Module (SIM) or other module as part of starting the subscription. Providing such removable memory cards with mobile devices and/or associated subscriptions is becoming increasingly prevalent in the industry. Because multimedia content can be quite sizeable in terms of digital volume, providing content on removable memory cards rather than over-the-air (OTA) will continue to be a common manner of distributing digital content.

As previously indicated, the valuable content should be protected in order to preserve revenue generating business for content producers (e.g., artists, musicians, authors, etc.) as well as content retailers (e.g., network operators, mISPs, etc.). In accordance with the present invention, the operator, mISP, or other entity can provide a sales package that includes the appropriate removable memory cards 202, such as an MMC. Each memory card will have a memory card identification (ID) 204 that is unique to each memory card 202. These memory cards 202 will be pre-loaded with content, such as, for example, ringing tones, logos, screen savers, Java, music, games, etc. In accordance with the present invention, the content is provided on the memory card 202 in a protected format. For example, in the illustrated embodiment, the content is in a protected format created by Nokia Corporation referred to herein as Secured Content Container (SCC). SCC as used herein generally refers to a container format that encapsulates encrypted digital content and optionally associated meta-data related to the content. For example, the content may be encrypted with a symmetric key. although in some cases the digital content may not be encrypted. SCC is logically associated with one or more rights files (RF), such that SCC files can be opened with the correct rights file. A rights file as used herein generally refers to an object that defines the rights that govern the usage of a specific piece of digital content.

The protected content is depicted in FIG. 2 as the SCC-protected content files 206. Also included on the memory card 202 is a rights database 208. Rights files for the SCC content files 206 are held in this rights database (RDB) 208. The rights database 208 itself is then placed into the SCC (or other) protected format, so that the rights files themselves are protected. The protection of the rights database 208 therefore assumes that a manner of accessing the rights files is needed. In accordance with the present invention, an encryption key for this particular SCC associated with the rights database 208 is not provided via another rights file, but rather is derived during manufacturing of the associated mobile terminal 200 based on a different mechanism of which several options exist in accordance with the present invention.

While the present invention is generally described in connection with removable memory cards, such as the memory card 202, the present invention is equally applicable where the memory card is manufactured integrally on the mobile terminal 200. For example, a substantially non-removable memory/storage card 210 in the mobile terminal 200 may include the SCC content files 206 and SCC rights database 208. For example, content may be provided in such a memory 210 along with a wireless telephone when the wireless telephone is sold to a consumer. It should therefore be recognized that the description of features associated with a removable memory card 202 are also applicable to non-removable memory/storage 210 that is activated during manufacture of the mobile terminal 200 in accordance with the present invention. It is also possible that content can be included on both removable 202 and non-removable 210 memories associated with a mobile terminal.

The present invention is also equally applicable to embodiments where the memory card 202 is either read/write memory or read-only memory (ROM). The memory card 202 may be ROM if, for example, the protection of the SCC holding the rights database 208 is sufficient, and the present invention contemplates a variety of options for providing such protection. A sufficiently secure mechanism to protect the special SCC that contains a ROM-based rights database 108 in fact provides certain advantages over a read/write memory card 202, although a read/write memory card also has certain advantages over a ROM-based removable memory implementation. For example, ROM based implementations are less expensive, as ROM is generally less expensive than read/write memories. On the other hand, read/write memories have, of course, the ability to store additional information thereon if desired.

In accordance with the invention, an encryption key or other key is derived in one of a number of possible manners to gain access to the SCC-protected rights files in the rights database 208 during the manufacturing process. For example, in one embodiment of the invention, the encryption key to open the rights database 208 can be a secret key 212 hidden in the software/firmware activation software 214 which is part of the existing mobile terminal software. This key 212 is provided to open the rights database 208 during the manufacturing process to activate the rights database 108 for use in accessing content 206 as governed by its respective rights file. In another embodiment, the memory card identification 204 (e.g., MMC ID) is used as the encryption key to open the rights database 208. A number of other embodiments are also possible, and are described more fully below.

Regardless of the manner in which the rights files in the rights database 208 are made accessible, one embodiment of the invention involves moving the rights database 208 to an active rights database 216 in the mobile terminal 200 itself, and removing the rights database 208 in the memory card 202, when the rights database 208 has been "activated" during the manufacturing process in accordance with the invention. Once activated, the individual active rights files RF1, RF2, RF3, etc. associated with the active rights database 216 may be used to gain access to the secure SCC content files 206.

Figure 3:
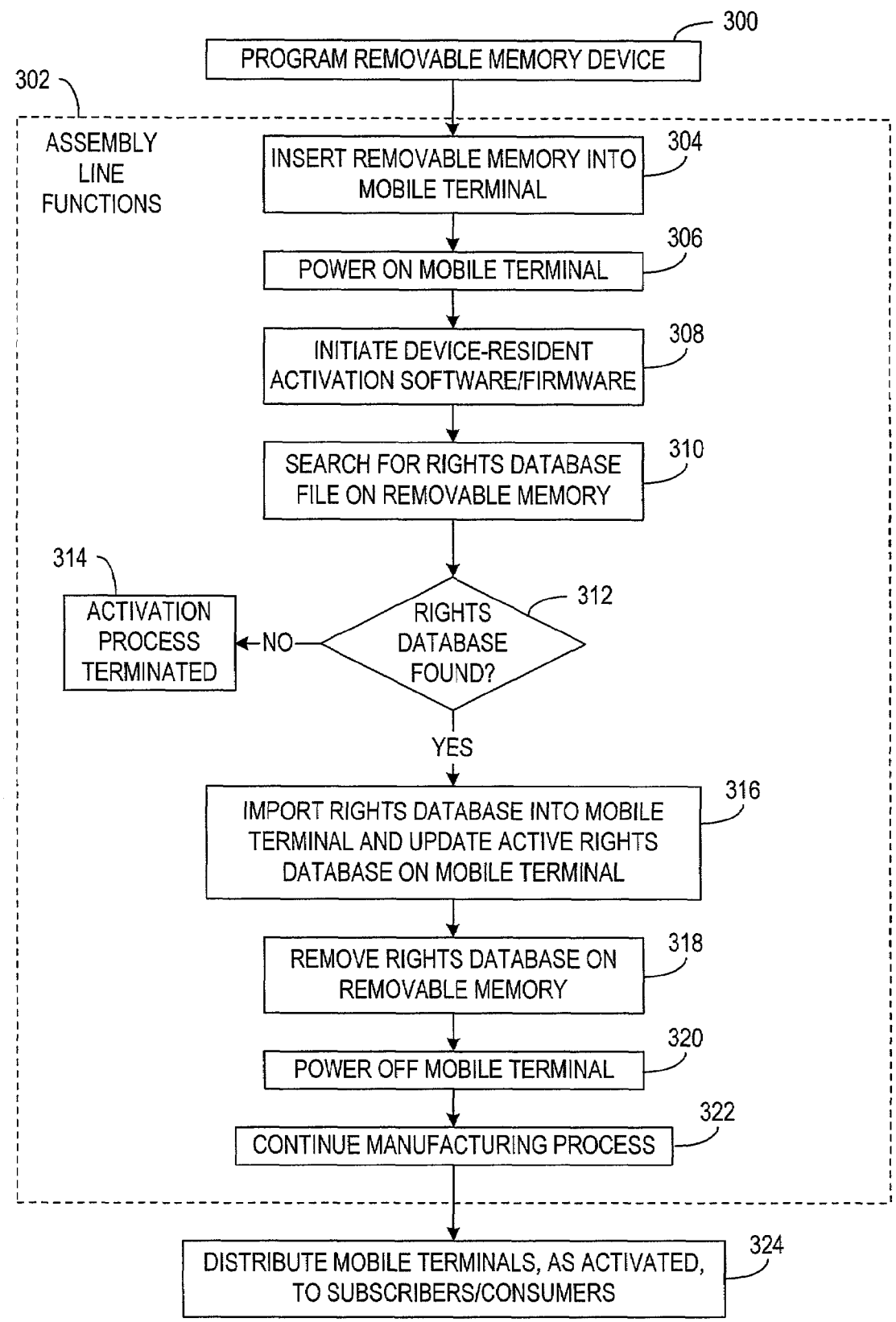
FIG. 3 is a flow diagram illustrating another exemplary embodiment of a method for activating protected content on a removable memory for use with a mobile terminal during the manufacturing process of the mobile terminal.

FIG. 3 is a flow diagram illustrating another exemplary embodiment of a method for activating protected content on a removable memory for use with a mobile terminal during the manufacturing process of the mobile terminal. A removable memory device is programmed 300. During assembly line functions 302, the memory device is inserted 304 into the mobile terminal. Power is provided to the mobile terminal, and the mobile terminal is then turned on, as shown at block 306. A program resident within the mobile terminal is initiated 308 to begin the activation process. In one embodiment of the invention, the device-resident program is a software (and/or firmware) module that is automatically run upon power on 306 to the mobile terminal. Alternatively, the device-resident program may be semi-automatically run upon power on 306 to the mobile terminal, such as by pressing a button, a combination of buttons, and/or a series of buttons on the mobile terminal to initiate 308 the activation program. Other user-interface mechanisms available on the mobile terminal may also be employed, such as voice-input, touch screen input, graphical user input, etc.

In accordance with the present invention, the removable memory device is programmed to include a protected rights database file. The protected rights database is a file secured in a predetermined fashion (e.g., SCC), and stores the various rights files that may ultimately be used to open particular pieces of content provided on the removable memory. After initiation of the device-resident software in connection with the assembly line functions 302, the software commences a search 310 for this rights database file stored on the removable memory. If the rights database is not found as determined at decision block 312, the activation process is terminated 314. If the rights database is found, it is imported 316 into the mobile terminal, and used to update the "active" rights database already available on the mobile terminal.

Further, the rights database on the removable memory is removed 318 or otherwise disabled as a security measure, so that a person who obtains unauthorized access to the removable memory will not be able to access the content since the rights database housing the rights files will no longer be available on the removable memory card. For example, the rights database may be deleted from the memory card, or moved from the memory card to the mobile terminal, which in either case leaves no rights database on the memory card. Other alternatives exist, such as obscuring the data associated with the rights database on the memory card, e.g., overwriting the rights database with any other data. Any manner of destroying the memory card-resident rights database may be used in accordance with the present invention.

Once the content is activated in such a fashion, the mobile terminal can be powered off 320, and the manufacturing process may continue 322 if other manufacturing stages are necessary. When manufacturing of the mobile terminal is complete, the mobile terminal may be distributed 324, as activated, to subscribers or other consumers of the mobile terminals.

It should be recognized that reference to "assembly line functions" as used herein does not imply that an actual assembly line must be present. While one embodiment of the invention contemplates performing such steps at various stages of a manufacturing assembly line, the present invention is equally applicable to the manufacture of a single (or small number) of mobile terminals manufactured one at a time and/or where the assembly stages are performed in no particular order. In other words, while the present invention is well-suited for use in assembly line functions 302, that need not be the case, as the various illustrated embodiments of the invention may be carried out by a person, robot, group, etc. with or without any manufacturing assembly line per se.

Figure 4:
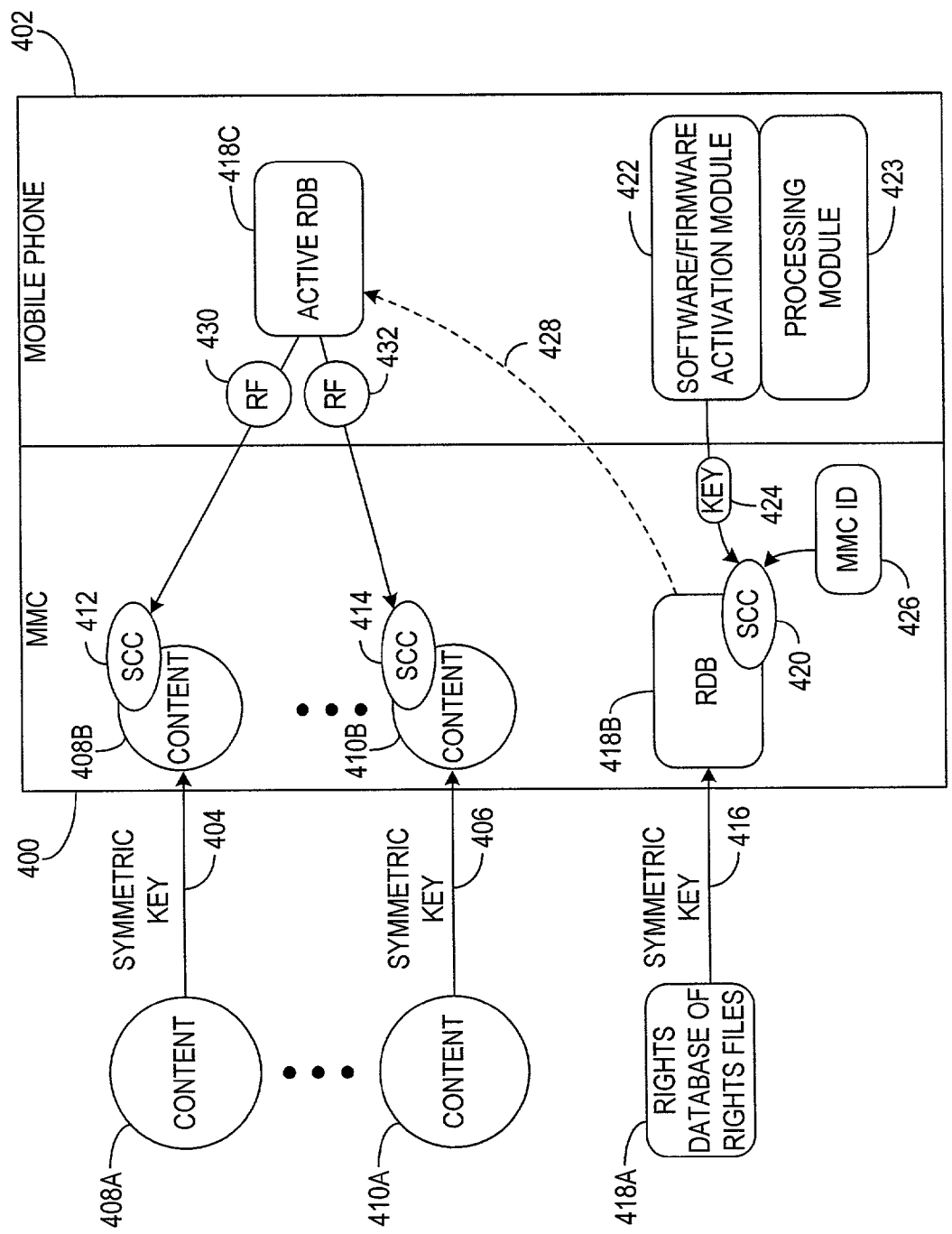
FIG. 4 is a block diagram illustrating a more particular exemplary embodiment for activating pre-loaded content on a mobile device memory during manufacturing in accordance with the principles of the present invention.

FIG. 4 is a block diagram illustrating a more particular exemplary embodiment for activating pre-loaded content on a mobile device memory during manufacturing in accordance with the principles of the present invention. The illustrated embodiment includes a removable memory card 400, which in the illustrated embodiment is an MMC, that can be plugged into a mobile device such as a mobile phone 402. The MMC 400 is pre-loaded with protected content. This is accomplished by applying a content key, such as symmetric keys 404, 406, to the content 408A, 410A that is to be loaded onto the MMC 400. The content 408A, 410A may have some associated meta-data.

The content (and associated meta-data, if any) is securely stored on the MMC 400 by way of SCCs. For example, the content 408A is stored on the MMC 400 as protected content 408B by way of the SCC 412. Similarly, the content 410A is stored on the MMC 400 as protected content 410B by way of the SCC 414. Any number of content pieces 408A, 410A may be stored on the MMC 400 in this fashion.

Also encrypted using, for example, a symmetric key 416 is the rights database 418A, which is a database of rights files. The rights database 418A is securely stored on the MMC 400 as protected rights database 418B by way of the SCC 420. A rights file is provided in the rights database 418A for each of the pieces of content 408A, 410A in which security is desired.

In order to access the encrypted content 408B, 410B, the appropriate rights file securely stored in the rights database 418B must be accessed. However, because the rights database 418B is also secured via the SCC 420, a manner of accessing the encrypted rights files in the rights database 418B during manufacturing of the mobile phone 402 is provided. In one embodiment of the invention, this is initiated after the MCC 400 has been coupled to the mobile phone 402 and the mobile phone 402 has been powered up during the manufacturing process. When this occurs, an activation procedure is initiated.

In one embodiment of a manufacturing activation procedure according to the present invention, the software resident on the mobile phone 402 includes a software/firmware activation module 422 that includes a secret key 424 hidden therein. This key 424 serves as an encryption key to decrypt the SCC 420, and thereby open the rights database 418B. Therefore, when the software/firmware module 422 is executed by a resident processing module 423 during the manufacturing process, the rights database 418B will become available. The rights files associated with the rights database 418B can thus ultimately be used to decrypt and allow use of the content 408B, 410B.

In accordance with another embodiment, a memory device identifier such as the MMC ID 426 serves as the encryption key to decrypt the SCC 420 to open the rights database 418B. Again, when the software/firmware module 422 is executed during the manufacturing process, the rights database 418B will become available. In another embodiment, both the key 424 and the MMC ID 426 may be used to derive the eventual encryption key for SCC 420. These and other embodiments are described further below.

In accordance with one embodiment of the invention, an additional security feature is effected once the rights database 418B has been opened. In this embodiment, the rights database 418B is loaded 428 to an active rights database 418C in the mobile phone 402 upon opening the SCC 420 file during the manufacturing process. Further, the rights database 418B is then removed from the MMC 400, which is safer from a security standpoint and increases security of the rights files (RF) 430, 432.

After the manufacturing process, the mobile phone 402 and associated memory device 400 can collectively be provided to a consumer. The consumer may want to access one or more of the pieces of protected content 408B, 410B. To do so, the appropriate rights file 430, 432 in the rights database 418C determines the user's usage rights to the respective content 408B, 410B. For example, where the ultimate user attempts to access the content 408B, an RF 430 corresponding to the content 408B will be used to access the content 408B. More particularly, the appropriate rights file from the rights database 418C is used to open the SCC 412 file. In one embodiment, the rights file includes a content encryption key that has been encrypted using the public key of the mobile phone 402. Once the content encryption key is made available by decrypting it using the private key, the content encryption key can then open the SCC 412 and thereby activate the content 408B.

Figure 5:
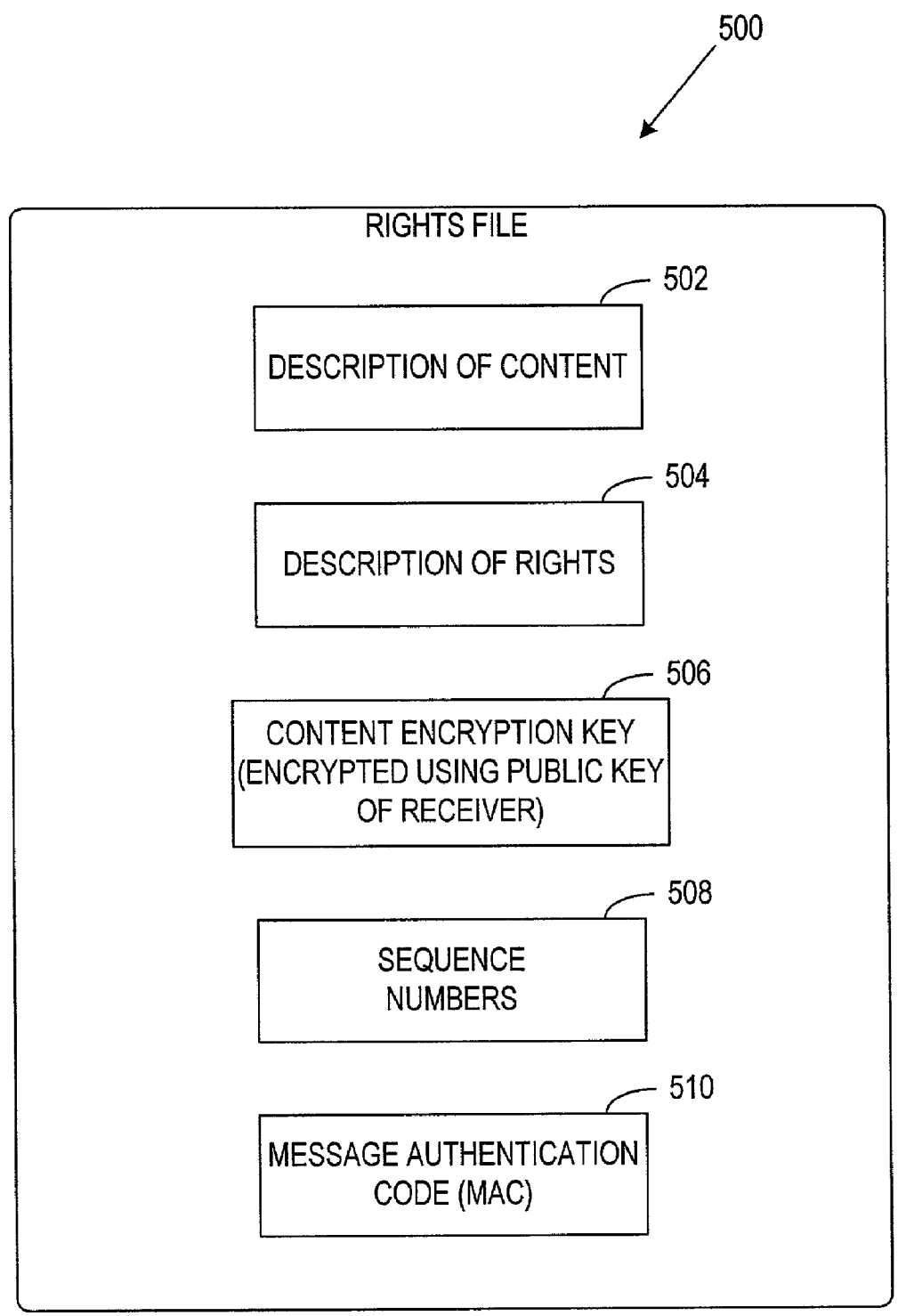
FIG. 5 is a block diagram of a representative rights file in accordance with the present invention.

The particular format or content of a rights file may vary. Therefore, while any number of rights file formats in which a user accesses content may be used, FIG. 5 is a block diagram of a representative rights file 500 in accordance with the present invention. A primary purpose of a rights file for purposes of the present invention is that it embodies the rights to a piece of content, as well as provides the means to access the content in the manner defined by the rights. Referring to the exemplary rights file 500, a description 502 of the content may be provided with the rights file, such as the type of content (e.g., audio, video, text, multimedia, etc.). Each piece of content, or selected pieces of content, will have a corresponding rights file 500, and the description 502 provides a description of its respective content.

For a particular piece of content, there is a description 504 of the rights to that content. These rights may include rights such as transfer rights and usage rights. For example, transfer rights may include the right to (or not to) give or sell the content to another user, or to give or sell a preview or other limited use of the content to another user. Transfer rights may also include rules as to whether the content can be copied to another device owned by the user. Any number of transfer rights may be included. Usage rights are policies specifying how this copy of the content may be used. For example, usage rights may include full access rights to the content, no access rights to the content, preview rights or some other limited usage rights. For example, "preview" usage rights may be provided to users for certain content upon receiving the pre-loaded memory card, to allow the user to have access to the content for a limited time (e.g., one week), a limited quantity of uses (e.g., three times), a limited amount of the content (e.g., thirty seconds of an MP3 song), etc.

The rights file 500 also includes the means to access the content as dictated by the usage rules. In one embodiment, this is provided by a content encryption key 506 that was used to encrypt the content, and the content encryption key 506 itself is encrypted using the public encryption key of the receiving device. Block 506 thus represents a desired security feature, one embodiment of which is to provide a content key encrypted using the public encryption key of the receiving device. The rights file may also contain other information, such as sequence numbers 508 to ensure freshness, and a message authentication code (MAC) 510 on all of the other fields, using the content encryption key.

As previously indicated, these rights files are stored in a rights database provided on the removable memory device. In accordance with the present invention, the rights database is activated during the mobile terminal manufacturing process, to allow ultimate access to the rights files stored in the rights database. FIGS. 6A, 6B, 6C, and 6D illustrate a number of representative alternative embodiments for activating the rights database on a removable memory device during the mobile terminal manufacturing process. The embodiments described in connection with FIGS. 6A, 6B, 6C, and 6D are provided as representative embodiments that are provided to facilitate an understanding of this aspect of the invention, however these representative embodiments do not represent an exhaustive list of the many analogous manners in which the rights database may be activated. Those skilled in the art will appreciate, from an understanding of the description herein, that a variety of alternative embodiments may be implemented in accordance with the principles of the present invention.

Figure 6A:
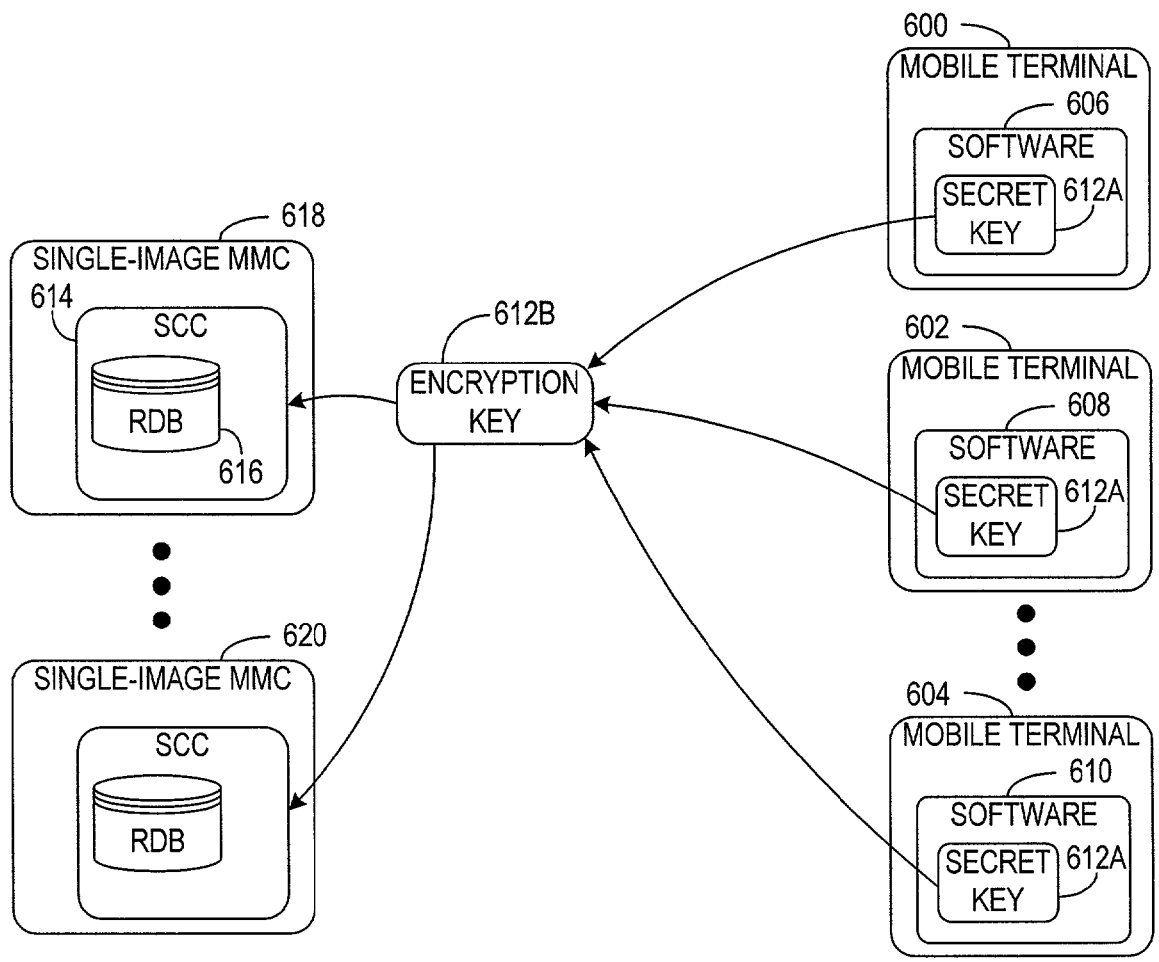
FIGS. 6A, 6B, 6C, and 6D illustrate a number of representative alternative embodiments for activating the rights database on a removable memory device during the mobile terminal manufacturing process.

FIG. 6A illustrates a first representative embodiment for activating the rights database on a removable memory device during the mobile terminal manufacturing process. In this embodiment, each (or selected ones) of the mobile terminals 600, 602, 604 that are being manufactured include internal software, such as software modules 606, 608, 610 respectively. A secret key 612A is hidden in the terminal software. In one embodiment of the invention, the secret key 612A is common to all (or selected ones) of the mobile terminal software modules. More particularly, a common secret key 612A is provided in the software modules 606, 608, 610 of each of the mobile terminals 600, 602, 604 that are being manufactured. The secret key 612A effectively becomes the encryption key 612B that is used to decrypt the SCC 614 protecting the rights database 616 in the removable memory device 618. Alternatively, the secret key 612A could be used by the software modules 606, 608, 610 to derive the encryption key 612B. With this embodiment, the same MMC "image" is provided for each MMC 618, 620 that is programmed. Therefore, there are no MMC variants, which is more cost-effective than providing multiple MMC images.

Figure 6B:
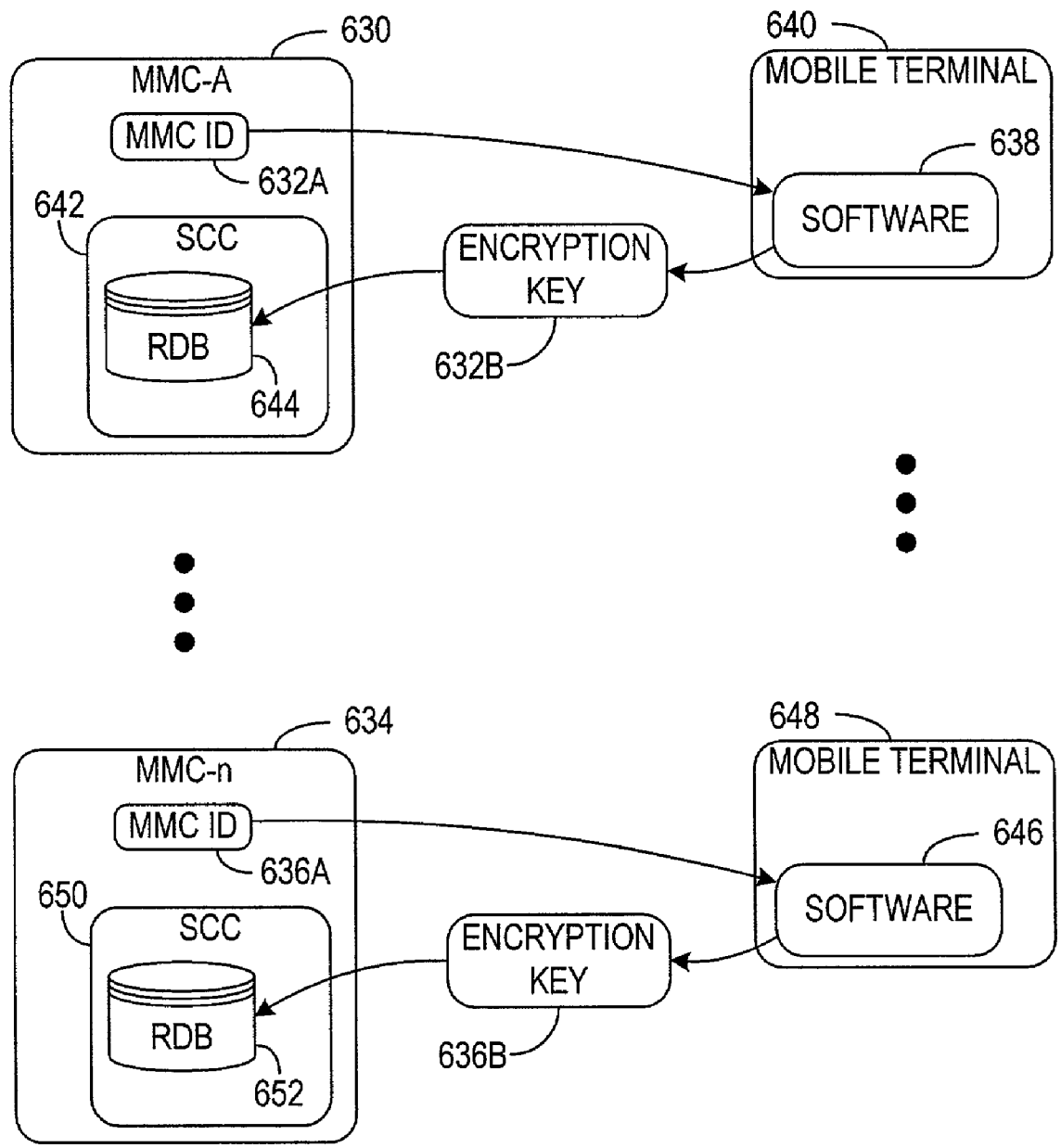

FIG. 6B illustrates another representative embodiment for activating the rights database on a removable memory device during the mobile terminal manufacturing process. In the illustrated embodiment, each of the removable memory cards that are being manufactured include a memory device identifier, such as an MMC ID. More particularly, MMC-A 630 includes MMC ID 632A, and an nth memory device MMC-n 634 includes MMC ID 636A. Each MMC ID is different for each memory device 630 through 634 in order to uniquely identify the memory device. Each of the MMC IDs 632A, 636A (or other memory identifier) is processed by its respective mobile terminal and used to decrypt its respective SCC/rights database during the manufacturing activation process. For example, MMC ID 632A is processed by software 638 within mobile terminal 640 which in turn uses the MMC ID 632A as the encryption key 632B to decrypt the SCC file 642 protecting the rights database 644 in the removable memory device 630. Similarly, MMC ID 636A is processed by software 646 within mobile terminal 648 which in turn uses the MMC ID 636A as the encryption key 636B to decrypt the SCC file 650 protecting the rights database 652 in the removable memory device 634.

Alternatively, the MMC IDs 632A, 636A could be used by the software modules 638, 646 to derive unique encryption keys 632B, 636B. With this embodiment, there will be a different MMC image programmed to each MMC device, since the SCC associated with each rights database is encrypted using a different MMC ID. Therefore this embodiment, while a fully capable manner of activating each rights database, is relatively costly due to the large number of MMC variants that will result.

Figure 6C:
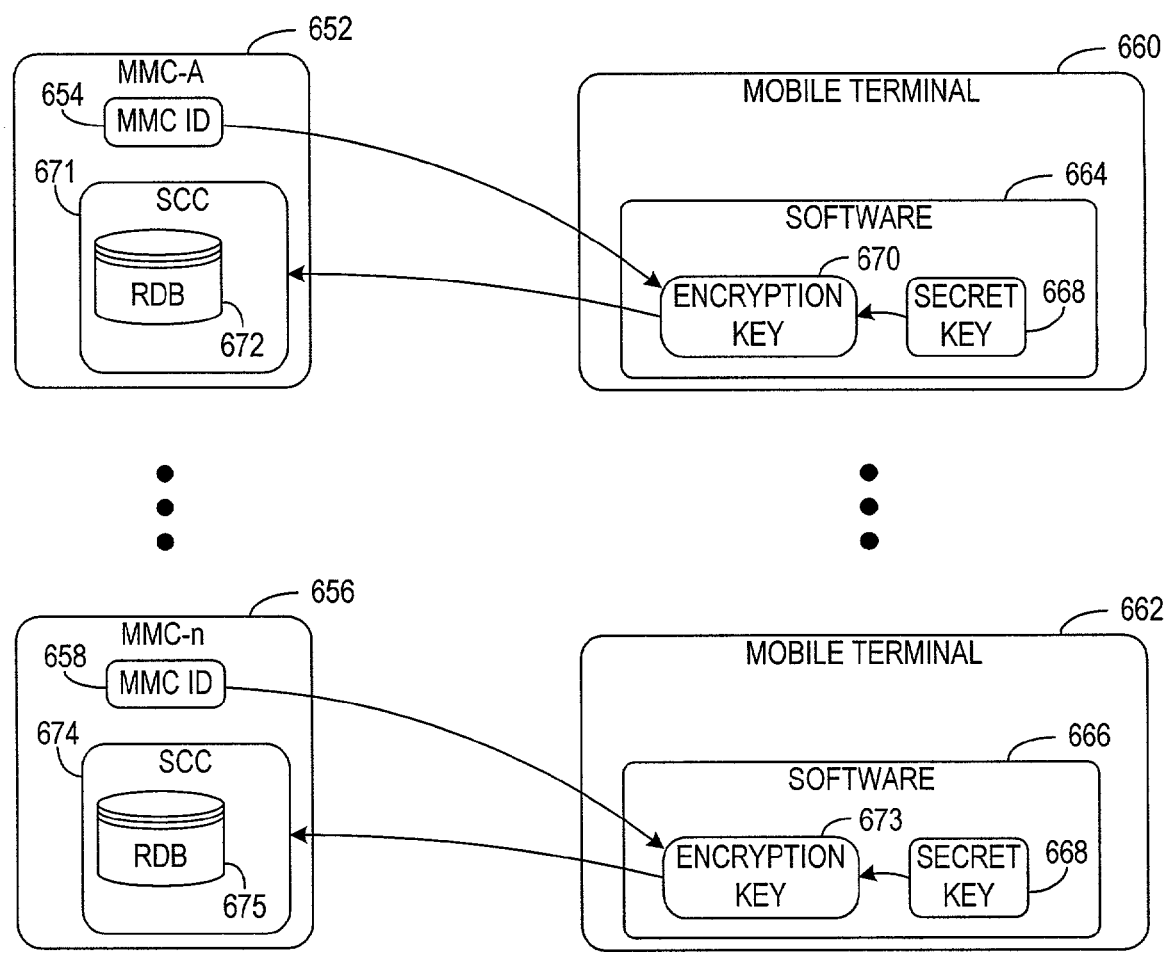

FIG. 6C illustrates another representative embodiment for activating the rights database on a removable memory device during the mobile terminal manufacturing process. In this embodiment, both a secret key and the memory device identifier are used to derive the ultimate encryption key for the rights database SCCs. Each of the removable memory cards that are being manufactured include a memory device identifier, such as an MMC ID. More particularly, MMC-A 652 includes MMC ID 654, and an $n^{th}$ memory device MMC-n 656 includes MMC ID 658. Each MMC ID is different for each memory device 652 through 656 in order to uniquely identify the memory device. Further, each of the mobile terminals 660, 662 that are being manufactured include internal software, such as software modules 664, 666 respectively. A secret key 668 is hidden in the terminal software, which in one embodiment is common to each of the mobile terminal software modules. More particularly, the secret key 668 is provided in the software modules 664, 666 of each of the mobile terminals 660, 662 that are being manufactured.

Using both the MMC ID and the secret key, an encryption key can be derived. For example, using the MMC ID 654 associated with MMC-A 652 and using the secret key 668 hidden in the software module 664 of mobile terminal 660, an encryption key 670 is derived. The encryption key 670 is then used to decrypt the SCC file 671 protecting the rights database 672 in the removable memory device 652. Similarly, using the MMC ID 658 associated with MMC-n 656 and using the secret key 668 hidden in the software module 666 of mobile terminal 662, an encryption key 673 is derived. The encryption key 673 is then used to decrypt the SCC file 674 protecting the rights database 675 in the removable memory device 656.

Figure 6D:
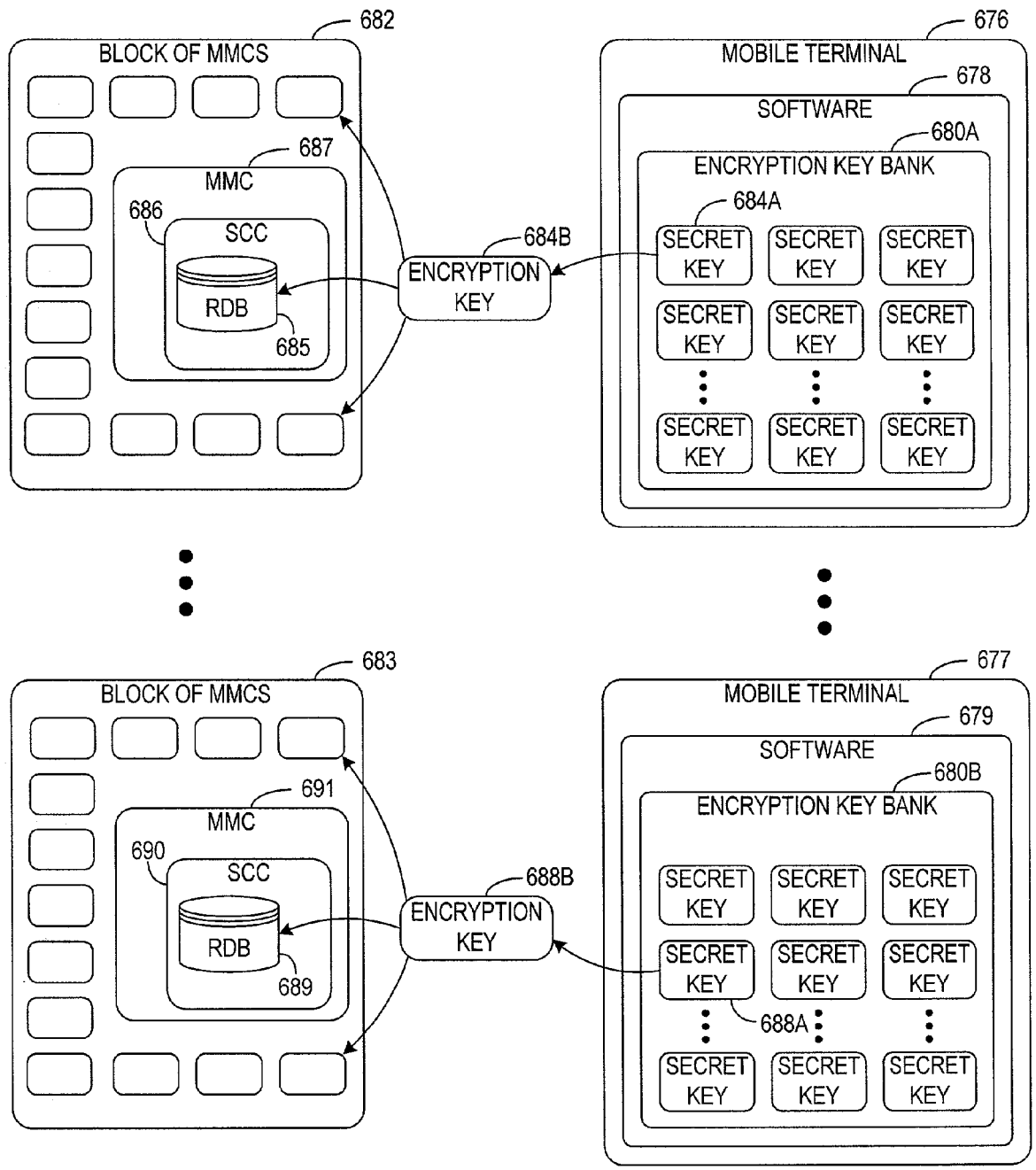

FIG. 6D illustrates another representative embodiment for activating the rights database on a removable memory device during the mobile terminal manufacturing process. In this embodiment, each mobile terminal 676, 677 includes software 678, 679, which further includes an encryption key bank 680A, 680B that may be the same for each of the software modules 678, 679. Each encryption key bank includes a number of secret keys, such as, for example, one hundred secret keys. Memory devices such as MMCs are programmed in blocks 682, 683 of MMCs. For example, programming may be performed on blocks of one million MMCs, although this number can be any desired number. Each run of programming uses a different key from the encryption key bank as the encryption key. For example, a first run of programming on the block of MMCs 682 may use a first secret key corresponding to secret key 684A to protect the rights database 685 via an SCC file 686 for each MMC 687 in the block 682. Similarly, another run of programming on the block of MMCs 683 may use a different secret key corresponding to secret key 688A to protect the rights database 689 via an SCC file 690 for each MMC 691 in the block 683.

Then, at the time of mobile terminal manufacturing, the appropriate secret key is used as the encryption key to activate the content by decrypting the SCC file protecting the rights database. More particularly, the secret key 684A can be used as the encryption key 684B during manufacturing to decrypt the SCC/rights database file in each of the MMCs that were programmed as part of the block of MMCs 682. Similarly, the secret key 688A can be used as the encryption key 688B during manufacturing to decrypt the SCC/rights database file in each of the MMCs that were programmed as part of the block of MMCs 683. Therefore, during the manufacture of a number of mobile terminals corresponding to the number of MMCs programmed in a block, the same secret key will be used as the encryption key 684B.

Figure 7:
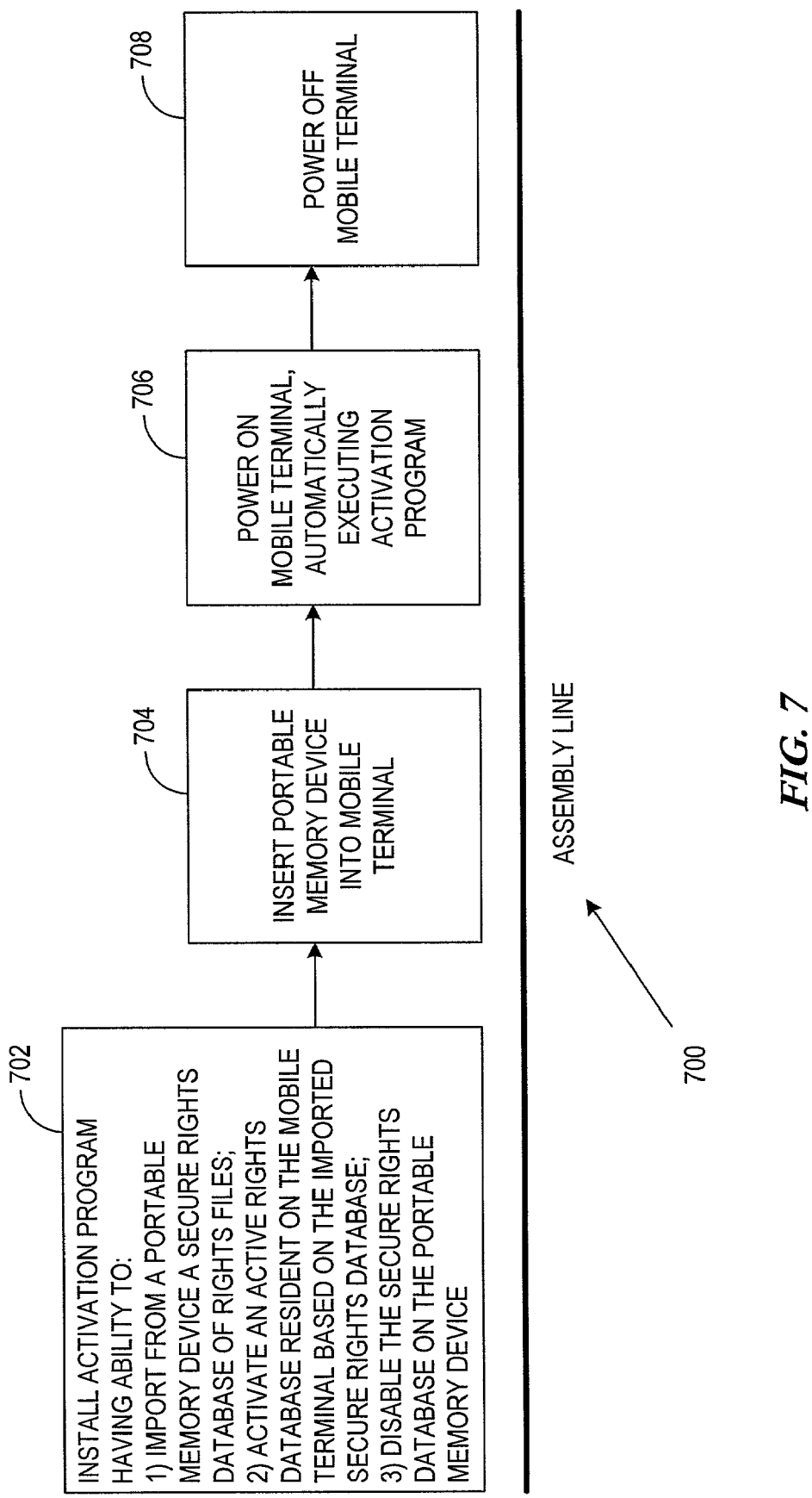
FIG. 7 is a diagram illustrating an exemplary assembly line process for manufacturing mobile terminals in accordance with the present invention.

FIG. 7 is a diagram illustrating an exemplary assembly line process for manufacturing mobile terminals in accordance with the present invention. The manufacturing assembly line 700 includes a plurality of assembly tasks, some of which are illustrated in FIG. 7. One assembly task 702 involves installing an activation program on a mobile terminal. The activation program is capable of importing a secure rights database of rights files from a portable memory device, activating an active rights database resident on the mobile terminal based on the imported secure rights database, and disabling the secure rights database on the portable memory device. Assembly task 704 involves inserting the portable memory device into the mobile terminal. The mobile terminal is then powered on at assembly task 706, which causes execution of the activation program. Assembly task 708 then includes powering off the mobile terminal when the activation program execution has completed. The manufacturing process can then continue with any additional assembly line tasks.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for activating a mobile terminal for use with a portable memory device during production of the mobile terminal, the method comprising:

coupling the portable memory device to the mobile terminal;

powering on the mobile terminal; and executing a mobile terminal-resident program which:

imports from the portable memory device a secure rights database of rights files;

locates an encryption key stored in the mobile terminal;

activates an active rights database resident on the mobile terminal based on the imported secure rights database by decrypting the imported secure rights database using the encryption key and updating the active rights database to include the rights files associated with the imported secure rights database; and disables the secure rights database on the portable memory device, wherein coupling the portable memory device to the mobile terminal, powering on the mobile terminal, and executing the mobile terminal-resident program are performed as one or more assembly line functions during production of the mobile terminal.

2. The method of claim 1, further comprising powering down the mobile terminal after disabling the secure rights database on the portable memory device.

3. The method of claim 1, wherein the mobile terminal-resident program further receives a memory device identifier unique to the portable memory device, and wherein decrypting the imported secure rights database comprises decrypting the imported secure rights database using the memory device identifier.

4. The method of claim 1, wherein the mobile terminal-resident program further derives an encryption key from a plurality of parameters including a secret key hidden within the mobile terminal-resident program and a memory device identifier unique to the portable memory device, and wherein decrypting the imported secure rights database comprises decrypting the imported secure rights database using the derived encryption key.

5. The method of claim 1, wherein the mobile terminal-resident program further locates a particular one of a plurality of encryption keys in an encryption key bank stored with the mobile terminal-resident program, wherein the particular encryption key was previously used to encrypt the secure rights databases stored on a group of portable memory devices including the portable memory device coupled to the mobile terminal, and wherein decrypting the imported secure rights database comprises decrypting the imported secure rights database using the particular encryption key from the encryption key bank.

6. The method of claim 1, wherein executing a mobile terminal-resident program comprises executing a mobile terminal-resident program which imports the secure rights database and disables the secure rights database by moving the secure rights database to the mobile terminal-resident program, thereby leaving no secure rights database on the portable memory device.

7. The method of claim 1, wherein executing a mobile terminal-resident program comprises executing a mobile terminal-resident program that disables the secure rights database by deleting the secure rights database on the portable memory device.

8. The method of claim 1, wherein executing a mobile terminal-resident program comprises executing a mobile terminal-resident program that disables the secure rights database by obscuring data associated with the secure rights database on the portable memory device.

9. The method of claim 8, wherein obscuring data associated with the secure rights database comprises overwriting the data associated with the secure rights database with data different from the data associated with the secure rights database.

10. The method of claim 1, wherein executing a mobile terminal-resident program comprises executing a mobile terminal-resident program which further searches for and locates the secure rights database on the portable memory device prior to importing the secure rights database.

11. The method of claim 1, wherein executing a mobile terminal-resident program comprises automatically initiating the mobile terminal-resident program upon power on of the mobile terminal.

12. The method of claim 1, wherein executing a mobile terminal-resident program comprises semi-automatically initiating the mobile terminal-resident program by activating at least one user-interface mechanism on the mobile terminal.

13. The method of claim 1, wherein powering on the mobile terminal comprises applying power to the mobile terminal and turning on the mobile terminal after the portable memory device has been coupled to the mobile terminal.

14. The method of claim 1, wherein coupling the portable memory device to the mobile terminal comprises inserting the portable memory device into a receptacle on the mobile terminal configured to receive the portable memory device.

15. The method of claim 1, further comprising pre-programming the portable memory device to include protected content and the secure rights database.

16. The method of claim 1, further comprising activating protected content on the portable memory device for post-production use via the mobile terminal by utilizing at least one of the rights files in the active rights database to decrypt the protected content if the corresponding rights file authorizes use of the protected content.

17. A mobile terminal comprising:
a removable memory card having stored thereon one or more items of secure content, and a secure rights database of rights files for enabling use of the secure content;
an active rights database;
a storage module for storing an activation program;
a processor configured to execute the activation program upon initiation of the activation program during production of the mobile terminal, wherein execution of the activation program performs steps comprising:
(a) importing the secure rights database from the removable memory card;
(b) locating en encryption key stored in the mobile terminal;
(c) decrypting the imported secure rights database using the encryption key;
(d) updating the active rights database to include the rights files associated with the decrypted secure rights database; and
(e) disabling the secure rights database on the removable memory card; and
wherein the processor is further configured to activate protected content post-production use by utilizing at least one of the rights files in the active rights database to decrypt the protected content if the corresponding rights file authorizes use of the protected content.

18. The mobile terminal as in claim 17, wherein the processor is further configured to execute the activation program to perform the step comprising receiving a memory card identifier unique to the removable memory card, and wherein decrypting the imported secure rights database comprises decrypting the imported secure rights database using the memory card identifier.

19. The mobile terminal as in claim 17, wherein the processor is further configured to execute the activation program to perform the step comprising deriving an encryption key from a plurality of parameters including a secret key hidden within the activation program and a memory card identifier unique to the removable memory card, and wherein decrypting the imported secure rights database comprises decrypting the imported secure rights database using the derived encryption key.

20. The mobile terminal as in claim 17, wherein the processor is further configured to execute the activation program to perform the step comprising locating a particular one of a plurality of encryption keys in an encryption key bank stored with the mobile terminal-resident program, wherein the particular encryption key was previously used to encrypt the secure rights databases stored on a group of removable memory cards including the removable memory card of the mobile terminal, and wherein decrypting the imported secure rights database comprises decrypting the imported secure rights database using the particular encryption key from the encryption key bank.

21. The mobile terminal as in claim 17, wherein the mobile terminal is at least one of a mobile telephone, personal digital assistant, portable computing device, and mobile music player.

22. The mobile terminal as in claim 17, wherein the removable memory card comprises at least one of a read/write memory card capable of being read from and written to and a read-only memory (ROM).

23. An assembly line process for manufacturing mobile terminals, comprising:
installing an activation program on a mobile terminal, wherein the activation program is capable of performing steps comprising:
(a) importing from a portable memory device a secure rights database of rights files;
(b) locates an encryption key stored in the mobile terminal;
(c) activating an active rights database resident on the mobile terminal based on the imported secure rights database by decrypting the imported secure rights database using the encryption key and updating the active rights database to include the rights files associated with the imported secure rights database; and
(d) disabling the secure rights database on the portable memory device;
inserting the portable memory device into the mobile terminal;
powering on the mobile terminal and executing the activation program in response thereto; and
powering off the mobile terminal upon completion of execution of the activation program, and wherein inserting the portable memory device into the mobile terminal, powering on the mobile terminal, and executing the activation program are performed as one or more assembly line functions during production of the mobile terminal.

* * * * *

UNITED STATES PATENT AND TRADEMARK OFFICE
CERTIFICATE OF CORRECTION

PATENT NO. : 7,367,059 B2
APPLICATION NO. : 10/161069
DATED : April 29, 2008
INVENTOR(S) : Leon Hurst et al.

Page 1 of 1

It is certified that error appears in the above-identified patent and that said Letters Patent is hereby corrected as shown below:

Column 15, Claim 17, line 51: "en" should be --an--.

Signed and Sealed this

Twenty-sixth Day of August, 2008

JON W. DUDAS
*Director of the United States Patent and Trademark Office*